United States Patent Office 2,891,088
Patented June 16, 1959

2,891,088
DI(CYANOALKYL) AND DI(CYANOALKENYL) POLYHYDROCARBYLXYLYLENES

Fred E. Condo, El Cerrito, and Robert W. Martin, Lafayette, Calif., assignors to Shell Development Company, New York, N.Y., a corporation of Delaware No Drawing. Application July 18, 1955
Serial No. 522,844

6 Claims. (Cl. 260—465)

This invention relates to a new class of di(aminoalkyl) aromatic compounds having especially advantageous properties. It deals particularly with novel di(aminoalkyl) xylylenes having at least three of the ring carbon atoms attached to separate hydrocarbon radicals and with the production of these new compounds and their applications in the preparation of valuable new compositions.

The new diamines of the invention can be described as compounds having a xylylene radical

to each of the methylene groups of which is linked an aminoalkyl radical of 1 to 5 carbon atoms and having at least three of the ring carbon atoms attached to separate hydrocarbon radicals of 1 to 6 carbon atoms each. In these novel compounds the amino groups are thus each at least two carbon atoms removed from the benzene ring and there will be not more than one hydrogen atom linked to the benzene ring. Due to this characteristic structural arrangement of the groups attached to the benzene ring, the new diamines have unexpected beneficial properties which make them particularly advantageous for important commercial applications.

Numerous different types of di(aminoalkyl)-substituted aromatic compounds have been described in the literature. Those having three or more alkyl groups linked to the ring have all been aminomethyl aromatic compounds such as bis(aminomethyl)durene in which the closeness of the amino group to the aromatic ring deprives them of the advantages of the new amines of the invention. The few examples of compounds having the amino group further removed from the ring, as in bis(beta-aminoethyl) benzene for example, have all been compounds containing a plurality of ring hydrogen atoms which make them liable to undesirable chemical attack and limits their practical applications, whereas the compounds of the present invention are not subject to either of these disadvantages.

Thus an important object of the present invention is the provision of new and useful aromatic diamines having a characteristic structure which gives them especially advantageous properties. Another object is to provide a novel method for producing these new diamines from the corresponding di(cyanoalkyl) or di(cyanoalkenyl) polyhydrocarbyl benzenes which are also new compounds of the present invention. A special object is to produce useful resinous polyamides using the new compounds of the invention as starting materials. Still other objects and advantages of the invention will be apparent from the following description of suitable methods for manufacturing the new compounds and for applying them in the production of polyamides and other valuable products.

It has been discovered that these and other objects can be accomplished by means of the novel di(aminoalkyl) polyhydrocarbyl-xylylenes of the invention which have as essential features at least three separate hydrocarbon radicals of 1 to 6 carbon atoms each linked to a different ring carbon atom of the xylylene radical and an aminoalkyl radical of 1 to 5 carbon atoms attached directly to each of the methylene groups of the xylylene radical. These new aromatic diamines can be divided into subclasses according to the relative positions of the two aminoalkyl groups linked to the benzene ring, that is, according to whether the aminoalkyl groups are in ortho, meta or para positions with respect to each other. For the preparation of linear polyamide resins the new diamines having the aminoalkyl groups in para position have been found to be superior to their ortho and meta isomers, in giving higher melting products. As starting materials for the manufacture of useful low melting resins the ortho-isomers are more advantageous than the para- or meta-compounds. The latter have different properties which are advantageous in other applications which make them a valuable part of the invention. In all three of these subclasses of the new diamines, those having all of the ring positions of the xylylene radical occupied have unexpected advantages even as compared with the new compounds in which one of the ring carbon atoms is unsubstituted since they give compositions which have good resistance to discoloration.

Either or both of the amino groups of the new diamines can be primary, secondary or tertiary amino groups. Thus these new compounds can be represented by the general formula

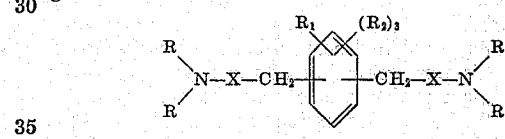

wherein R and $R_1$ are hydrogen atoms or hydrocarbyl radicals containing up to 6 carbon atoms, $R_2$ is a hydrocarbyl radical containing up to 6 carbon atoms and X is an alkylene hydrocarbon radical of 1 to 5 carbon atoms. Particularly preferred diamines of the invention are the primary diamines of this type in which $R_1$ and each of the three $R_2$'s is an alkyl radical, such, for example, as methyl, ethyl, propyl, isopropyl, normal butyl, secondary butyl, isobutyl, the amyl and the hexyl radicals.

As previously indicated, the diamines which have outstanding advantages over previously known compounds, particularly because of their ability to produce linear polamides which have superior fiber-forming properties combined with high resistance to discoloration, are compounds of the formula

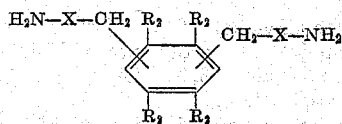

in which the $R_2$'s represent the same or different alkyl radicals of up to 6 carbon atoms as described above, with methyl groups being especially advantageous, and each X represents an alkylene radical of 1 to 5 carbon atoms. Among these preferred diamines, the symmetrical bis(aminoalkyl) compounds having an odd number of carbon atoms in the chain linking the nitrogen atoms to the xylylene radical are an exceptionally advantageous subgroup of the new diamines of the invention.

The novel diamines can be produced in a number of different ways. One method which has been found to offer special advantages in synthesizing certain of the particularly desirable new products is hydrogenation of the corresponding dinitriles. These dinitriles are new compounds which are also a feature of the present invention. They have the same structural arrangement as the diamines except that a cyano group, —C≡N, is present in the molecule in place of each aminomethylene group of the diamine. On hydrogenation each cyano group is converted to a —CH₂—NH₂ group.

The starting dinitriles can be conveniently prepared from the corresponding di(haloalkyl) benzenes having at least three separate hydrocarbon radicals of no more than 6 carbon atoms each, preferably alkyl, cycloalkyl, alkenyl or phenyl radicals, linked directly to the benzene ring, by reaction with an alkali metal cyanide. Sodium cyanide is generally preferred because it is cheap and readily available, but potassium cyanide and the like can be used in the same way. The reaction can be carried out efficiently in solution in a suitable solvent, such, for example, as dioxane, acetone, methyl ethyl ketone, dimethoxy ethane, etc. A stoichiometric excess of alkali metal cyanide of the order of about 2.1 to about 2.5 moles per mole of the di(haloalkyl) benzene is usually desirable but lower proportions can be used at some sacrifice in conversion of di(haloalkyl) benzene per pass. By using temperatures of the order of about 80 to about 100° C. the reaction can be completed in about 5 to about 10 hours. The di(cyanoalkyl) polyhydrocarbyl benzenes obtained by this method can be isolated from the reaction mixture by removing the more volatile solvent and then distilling off the product, preferably under reduced pressure. However, especially when carrying out the reaction in a solvent which is inert under the hydrogenation conditions, it is feasible to convert the di(cyanoalkyl) polyhydrocarbyl benzene to the corresponding di(aminoalkyl) xylylene compound without isolating it from the reaction mixture in which it is prepared.

Di(haloalkyl) polyhydrocarbyl benzenes useful as starting materials for production of the new di(cyanoalkyl) compounds are available or can be prepared by conventional methods. Halogenation of hexaalkyl benzenes using less than two moles of halogen per mole of hexaalkyl benzene and recycling monohalogenation products to insure mono-halo substitution of two different alkyl groups is one suitable method. Thus bis(chloromethyl) tetramethyl benzene is prepared by chlorinating hexamethyl benzene. By reacting polyhydrocarbyl benzenes having 3 to 4 hydrocarbyl groups attached to the benzene ring with formaldehyde and hydrogen chloride bis(chloromethyl) polyhydrocarbyl benzenes are obtained. In this way bis(chloromethyl) tetraethyl benzene, for example, has been produced from tetraethyl benzene. Alternatively, one can alkylate di(chloroalkyl) benzenes having less than three hydrocarbyl groups linked to the benzene ring in order to obtain alkylation products suitable for use in preparing the di(cyanoalkyl) compounds of the invention. U.S. Patent 2,275,312 describes a suitable method for carrying out such alkylations, for instance the alkylation of 2,5-di(beta-chloroethyl) toluene with isobutylene in the presence of hydrogen fluoride as catalyst to obtain 1,3,4-triisobutyl-6-methyl-2,5-di(beta-chloroethyl) benzene.

The hydrogenation of the new di(cyanoalkyl) polyhydrocarbyl benzenes is preferably carried out in the liquid phase, advantageously with a hydrogenation catalyst such as nickel, copper chromite, palladium black, or the like. The catalyst may be used in the form of a fixed bed of catalyst on a support such as alumina, charcoal, etc. through which the di(cyanoalkyl) polyhydrocarbyl benzene is passed together with hydrogen or the hydrogenation can be carried out with the catalyst suspended in the reaction mixture directly. In either case the reaction is preferably conducted with a solution of the di(cyanoalkyl) compound in a solvent such as ethanol, tertiary butanol, tetrahydrofuran, dioxane, and the like which is inert under the reaction conditions. It is important that the hydrogenation be carried out in the presence of ammonia and most advantageously the solution is kept saturated with ammonia to suppress side reactions during the reduction. Temperatures of the order of about 80° to about 120° C. have been found to be suitable when using a hydrogen pressure of about 1000 to about 3000 p.s.i.g.

This method of producing the new di(aminoalkyl) polyhydrocarbylxylylenes is illustrated by the following equations showing the production of 1,4-bis(delta-aminobutyl) tetraethyl benzene which can also be described as bis (gamma-aminopropyl) tetraethyl-para-xylylene from 1,4-bis(gamma-chloropropyl) tetraethyl benzene.

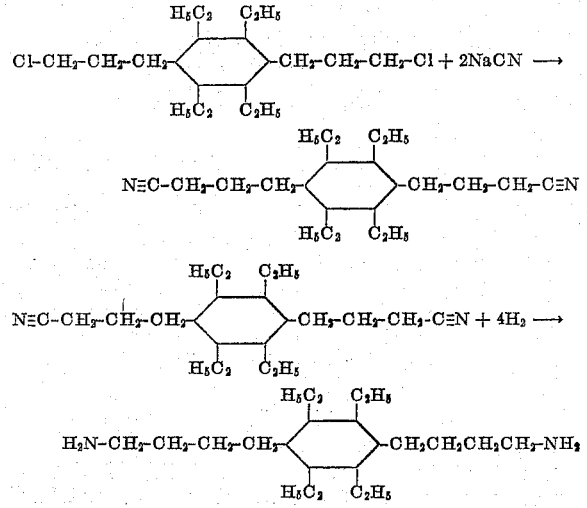

Alternatively di(haloalkyl) polyhydrocarbylxylylenes can be reacted with ammonia to obtain di(aminoalkyl) compounds of the invention having two less carbon atoms per molecule than when the foregoing method of reaction with an alkali metal cyanide is used. The reaction is preferably carried out with a large excess of ammonia to minimize formation of secondary and tertiary amines by reaction of the initially formed di-primary amines. Reaction at about 20° to 80° C. with addition of the di(haloalkyl) xylylene to liquid ammonia with rapid stirring is an advantageous method of operation. Solvents for the di(haloalkyl) polyhydrocarbylxylylene, for instance hydrocarbons such as benzene or ethers as diethyl ether or the like, can be used to promote intimate contact between the reactants. This method of reaction gives high yields of desirable di(primary aminoalkyl) compounds. Thus 1,4-bis(alpha,alpha-dimethyl-beta-aminoethyl)-2-methyl-3,5-diisopropyl benzene is obtained from the corresponding di(monochlorotertiary butyl)-2,4-diisopropyl toluene, for example.

Still other methods which can be used to synthesize the new di(aminoalkyl) polyhydrocarbyl xylylenes include catalytic hydrogenation of the corresponding nitro compounds, and addition of ammonia to the olefinic double bonds of the corresponding dialkenyl polyalkyl benzenes. Thus hydrogenation of bis(gamma-nitro-n-butyl) tetrabutyl benzene gives a good yield of bis(3-aminobutyl) tetrabutyl benzene and 1,4-bis(2-methyl-3-aminopropyl) tetramethyl benzene is obtained by addition of ammonia to bis(tertiary butenyl) durene.

The following examples illustrate specific embodiments of this invention.

*Example I*

Bis(cyanomethyl) durene is produced by reacting bis(chloromethyl) durene with sodium cyanide in dioxane solution. Using 0.1 mole of bis(chloromethyl) durene and 0.246 mole of potassium cyanide with one gram of potassium iodide and 80 ml. water in 200 ml. of dioxane and a temperature of 85–95° C., the reaction is complete in 10 hours. The reaction mixture was poured into water and the precipitate was collected. Weight 20.36 grams; calculated yield=21.2 grams, or over 90% based on the starting bis(chloromethyl) durene. The product was recrystallized from hot dioxane and had a melting point of 267–268° C. It analyzed 12.84% nitrogen (calculated: 13.2%).

Example II

Bis(cyanomethyl) durene prepared as in Example I was hydrogenated in tetrahydrofuran solution saturated with ammonia using Raney nickel as the catalyst. At a temperature of 80–100° C. and a hydrogen pressure of 1700 p.s.i.g. the theoretical amount of hydrogen is taken up in one-quarter hour. Distillation of the reaction mixture after filtration to remove the suspended catalyst gave 20.13 grams of solid, M.P. 99–102° C., or a yield of 90+%. After recrystallization from heptane the product was identified as bis(beta-aminoethyl) durene melting at 103–105° C. This diamine reacts rapidly with carbon dioxide or air so that preparation of pure sample requires care. Analysis: primary amine nitrogen: found=0.97 eg./100 grams; calculated=0.91; molecular weight: found=229; calculated=220. Total nitrogen: found=12.25; calculated=12.73. The dihydrochloride salt was prepared and chloride ion was titrated by Volhard method. Calculated=6.75 meq./g.; found=6.82 meq./g. The dihydrochloride was also analyzed for C, H, N and Cl. Cl=24.9, calculated=24.2; N=9.29, calculated=9.57; C=57.4, calculated= 57.4; H=9.01, calculated=8.95.

Example III

Bis(beta-aminoethyl) durene was converted to the adipic acid salt by dissolving equal molar quantities of the acid and diamine in alcohol and mixing the solutions. The salt was recrystallized from a mixture of alcohol and water.

A polyamide copolymer derived from the adipic acid salt of bis(beta-aminoethyl) durene and the similarly prepared adipic acid salt of 1,6-hexamethylene diamine was produced as follows:

183 parts of the salt from bis(beta-aminoethyl) durene and adipic acid and 1.31 parts of salt of hexamethylene diamine and adipic acid (representing equimolar quantities of the salts) were placed in a glass reactor. The reactor was equipped with a gas-inlet tube reaching to the bottom of the reactor. Dry, oxygen-free nitrogen was introduced through the tube during the course of the reaction. The reactor was equipped with a vent which allowed for escape of water and nitrogen but prevented the entry of air from the outside. The reactor was heated by immersing in a Wood's metal bath held at the proper temperature. The bath temperature was raised from 260° to 300° C. over a period of 1 hour and 22 minutes and was held at 293–308° C. for a total of 4 hours and 48 minutes. An amber colored polymer was formed which was extremely viscous at 300° C. When a glass rod was touched to the melt, fibers could be drawn from the melt. The fibers exhibit "cold drawing." The resin softens to a rubbery mass at 225–230° C. and forms a very viscous melt at 255–260° C.

Example IV

The 1:1 salt of sebacic acid and bis(beta-aminoethyl) durene was placed in a reaction vessel similar to that described in Example III. The reactor was again heated by immersion in a Wood's metal bath held at the proper temperature. The bath temperature was raised from 275° to 308° C. over a period of 65 minutes. The heating was continued at 308–314° C. for 25 minutes under vacuum at 200–230 mm. pressure. The heating was continued at 314–320° C. for 75 minutes with pressure very low (Hy-Vac pump). The polymer dissolved almost completely in boiling phenol. It was a clear tough resin. It softened around 285° C. and formed a viscous melt around 320° C.

Example V

The reaction of Example IV was repeated using the 1:1 salt of sebacic acid and bis(beta-aminoethyl) durene prepared by the method described in Example III. After 1 hour and 25 minutes at 295–314° C. a high vacuum (0.5 mm.) was applied. Heating was continued for 3½ hours with the heating bath at 310–317° C. A clear, pale tan, solid resin which was very tough had formed. It dissolved very slowly in boiling phenol. Most other solvents had little effect on the resin. It softened at 280° C. and formed a viscous melt at about 320° C.

Example VI

A salt of eicosanedioic acid and bis(beta-aminoethyl) durene in a 1:1 mole ratio was prepared by mixing together ethanolic solutions of the acid and diamine. The white solid salt which is formed is nearly insoluble in water and was not recrystallized. The dried salt was placed in a reactor as described in Example III and heated, using the Wood's metal bath, for 1 hour in a stream of nitrogen at 230–260° C. A vacuum was then applied using the above Hy-Vac pump and the temperature was maintained at 240–260° C. for 4¼ hours. The polymer produced softens around 225° C. and forms a viscous melt at about 233° C. and gels in contact with air. The polymer was brittle and light amber and it was further polymerized in a molecular still which consisted of refluxing dimethyl phthalate surrounding a vessel containing the nylon-like polymer under a high vacuum. The polymer was heated 6¾ hours at approximately 250° C. It was a tough flexible polymer when in thin sections and if melted in the presence of oxygen appears to gel. The polymer was soluble in hot phenol, softens around 230° C. and forms a viscous melt at about 240° C.

Example VII

Bis(beta-chloro-n-propyl) durene reacted with sodium cyanide by the method of Example I gives a good yield of bis(beta-cyano-n-propyl) durene which on hydrogenation under the conditions of Example II is converted to bis(beta-methyl-gamma-amino-n-propyl) durene in good yield.

A resinous polyamide is obtained by converting bis-(beta-methyl-gamma-amino-n-propyl) durene to the adipic acid salt and heating under the conditions of Example III. This polyamide is somewhat lower melting than the product of Example III.

Example VIII

Bis(beta-amino-n-propyl) durene is produced by reacting bis(beta-chloro-n-propyl) durene with liquid ammonia using a stirred autoclave charged with liquid ammonia under about 250 p.s.i.g. pressure into which the bis(beta-chloro-n-propyl) durene dissolved in benzene is slowly run in while maintaining the temperature at about 30° C. After adding about one mole of the dichloropropyl durene to about 200 moles of ammonia and stirring for approximately an hour, the excess ammonia is removed and the mixture distilled to recover a good yield of bis(beta-amino-n-propyl) durene.

Example IX

Bis(beta-amino-n-propyl) durene prepared as in Example VIII is converted into a resinous polyamide by reaction with sebacic acid to form the salt and subsequent heating under the conditions of Example IV. This polyamide is lower melting than the corresponding product from bis(beta-aminoethyl) durene but is fiber-forming and highly resistant to discoloration.

Example X

Bis(5-chloro-2-pentenyl) durene is reacted with sodium cyanide under the conditions of Example I to obtain bis-(5-cyano-2-pentenyl) durene which was recovered and hydrogenated in tetrahydrofuran solution with Raney nickel catalyst under 1600 p.s.i.g. pressure of hydrogen at 85–95° C. for about 20 minutes to obtain bis(omega-aminohexyl) durene in good yield. This product is converted to a polyamide resin by reaction with adipic acid as described in Example III.

Example XI

This example illustrates the preparation and some of the properties of bis(delta-aminobutyl) prehnitene.

287 parts (1 mole) of bis(gamma-chloropropyl) prehnitene are dissolved in dioxane and reacted with 122.5 parts (2.5 moles) of sodium cyanide at about 90° C. for 10 hours. After removal of the solvent and recrystallization from ethanol the product is identified as bis(gamma-cyanopropyl) prehnitene. Hydrogenation of the bis(gamma-cyanopropyl) prehnitene as a 5% solution in anhydrous ethanol saturated at 0° C. with ammonia using 7 grams of Raney nickel catalyst per liter of solution at about 85° C. under 100 atmospheres of hydrogen for 1½ hours, gives, after distillation in vacuo, bis(delta-aminobutyl) prehnitene.

A resinous polyamide was obtained by reacting the polyamine with adipic acid under the conditions used in Example III.

Example XII

Bis(gamma-aminopropyl) isodurene is produced by the method of Example VIII by replacing the bis(beta-chloropropyl) durene by an equal amount of bis(gamma-chloropropyl) isodurene. The resulting white crystalline product reacts with sebacic acid to form a polyamide resin which also has fiber-forming properties.

Example XIII 1,4-bis(beta-aminoethyl)-2,3,6-trimethyl benzene is produced by hydrogenating in the presence of Raney nickel catalyst under the conditions of Example II, 1,4-bis(cyanomethyl)-2,3,6-trimethyl benzene obtained by reacting 1,4-bis(chloromethyl)-2,3,6-trimethyl benzene with sodium cyanide as described in Example I.

By substituting an equivalent amount of 1,2-bis(alpha-chloroethyl)-3,4,6-trimethyl benzene for the 1,4-bis(chloromethyl)-2,3,6-trimethyl benzene, 1,2-bis(alpha-cyanoethyl)-3,4,6-trimethyl benzene is obtained under the same conditions and hydrogenation in the same way then gives a product identified by analysis as 1,2-bis(alpha-methyl-beta-aminoethyl)-3,4,6-trimethyl benzene.

It will be understood that the foregoing examples are merely illustrative and that the present invention broadly comprises, with respect to new compounds, the di(aminoalkyl) polyhydrocarbyl xylylenes having an aminoalkyl radical of 1 to 5 carbon atoms linked to each of the two methylene groups of the xylylene radical and at least three of the ring carbon atoms thereof substituted by separate alkyl, cycloalkyl, alkenyl or phenyl radicals each containing 1 to 6 carbon atoms; the di(cyanoalkyl) polyhydrocarbyl benzenes corresponding thereto, that is, those containing 1 to 6 carbon atoms in each of the cyanoalkyl groups and three to four separate alkyl, cycloalkyl, alkenyl or phenyl radicals directly linked to the benzene ring; and the polyamides of these new diamines with dicarboxylic acids.

In addition to the specific di-(cyanoalkyl) polyhydrocarbyl benzenes mentioned in the examples, other aliphatic, cycloaliphatic and phenyl-substituted di(cyanoalkyl) benzenes can be successfully used as starting materials for hydrogenation according to the process of the invention. Specific examples of these useful di(cyanoalkyl) polyhydrocarbyl benzenes include 1,4-bis(1-cyanoisopropyl) tetramethyl benzene, 1,2-bis(cyanomethyl)-3,4,5-tetraethyl benzene, 1,3-bis(2-cyanoethyl)-2,4,6-tri cyclohexyl benzene, 1,5-bis(1,2-dimethyl-2-cyanoethyl)-2-methyl-3,4-diamyl benzene and 1,3-bis(2-cyanoisopropyl)-2,5-diethyl-4-phenyl benzene.

Specific di(aminoalkyl) polyhydrocarbyl xylylenes forming a part of this invention include, in addition to those of the examples, 1,4-bis(alpha,alpha-dimethyl-beta-aminoethyl) - 2,3,5,6 - tetramethyl benzene, 1,4-bis(alpha,beta-dimethyl-beta-aminoethyl)-2,3,5,6-tetramethyl benzene, 1,4 - bis(beta,beta - dimethyl - beta - aminoethyl)-2,3,5,6-tetramethyl benzene, 1,4-bis(beta-amino-n-butyl)-2,3,5,6-tetramethyl benzene, 1,4-bis(gamma-amino-n-butyl)-2,3,5,6-tetramethyl benzene, 1,4-bis(epsilon-amino-n-amyl)-2,3,5,6-tetramethyl benzene, 1,4-bis(beta-aminoethyl)-2,3,5,6-tetraethyl benzene, 1,4-bis(beta-amino-n-propyl)-2,3,5,6-tetraisopropyl benzene, 1,4-bis(gamma-amino-n - propyl) - 2,3,5,6 - tetrabutyl benzene, 1,4-bis-(amino-tertiary butyl)-2,3,5,6-tetraamyl benzene, 1,4-bis(omega-aminohexyl)-2,3,5,6-tetrahexyl benzene, 1-(beta - aminoethyl) - 4 - (beta - aminopropyl) - 2,3,5,6-tetramethyl benzene, 1 - (beta - aminoethyl) - 4 - (alpha-methyl - beta - aminoethyl) - 2,3,5,6 - tetraisobutyl benzene, 1 - (gamma - aminopropyl) - 4 - (gamma - aminobutyl) - 2,6 - dimethyl - 3,5 - diethyl benzene, 1,4 - bis (beta - methylaminoethyl) - 2,3,5,6-tetramethyl benzene, 1 - (delta - aminoamyl) - 4 - (beta - methylaminoamyl)-2,3,5,6-tetramethyl benzene, 1-(beta-diethylaminoethyl) 4 - (omega - isopropylaminohexyl) - 2,3 - diisopropyl-5,6 - diamyl benzene, 1,4 - bis(6 - amino - 3 - hexenyl)-2,3,5,6-tetramethyl benzene and 1-(3-ethylaminobutyl)-4 - (5 - amino - 2 - pentenyl) - 2,5 - dimethyl - 3,6-diteritiarybutyl benzene.

As previously indicated the new di(primary- and/or secondary-aminoalkyl) polyhydrocarbyl xylylenes of this invention are especially advantageous components of polyamide resins because of the resistance to water and solvent and other advantageous properties which they impart to the final product. They can be successfully reacted with polycarboxylic acids generally to form amides and polyamides. Specific polycarboxylic acids other than those used in the examples, well adapted for use in preparing these new polyamides, include oxalic acid, maleic acid, succinic acid, pimelic acid, glutaric acid, 1,12-dodecanedioic acid, 1,16-hexadecanedioic acid, 1,20-eicosanedioic acid, phthalic acid, terephthalic acid, and durene dicarboxylic acid.

The particular member or mixture of members of the new class of di(aminoalkyl) xylylenes which it will be most advantageous to use under particular circumstances will depend upon the purpose for which the polyamide is being prepared. Thus, for example, it has been generally found that with the same dicarboxylic acid, the melting point of the polyamide is higher when using one of the new di-primary-amines than when using the corresponding new secondary amine. Also the new polyamides made with a given dicarboxylic acid have lower melting points as the length of the alkyl chain separating the amino group from the ring in the new diamines is increased. Similarly the melting point of polyamides prepared from the same member of the new class of diamines decreases as the chain length of the dicarboxylic acid reacted therewith is increased. Advantage can be taken of these facts to control the melting point of the polyamide which is synthesized to make it most useful for its intended end application. For instance in the preparation of fiber-forming polyamides from the new compounds it is desirable to produce those which melt between about 250° and 300° C., most advantageously between about 255° and 275° C. To make fibers with bis(beta-aminoethyl) durene one should use aliphatic dicarboxylic acids having 8 to about 18 carbon atoms separating the carboxyl groups. With bis(6-aminohexyl) durene, on the other hand, dicarboxylic acids having a chain of 6 to 14 carbon atoms separating the carboxyl groups can be used advantageously to make fiber-forming polyamides.

Another method which has been found useful for controlling the properties of the new polyamide products of the invention is copolymerization or cocondensation of the novel diamides of hydrocarbon-substituted di(aminoalkyl) xylylenes as hereinbefore described and dicarboxylic acids with dicarboxylic acid amides of other primary and secondary diamines. Advantageously amides of aliphatic diamines can be employed in this way with the new diamides of the invention to obtain new polyamides of lower melting point than the corresponding products made with the new diamides alone. Aliphatic diamides having 5 to 18 carbon atoms in the chain linking the amino groups such as pentamethylene diamine, decamethylene diamine, octadecamethylene diamine, etc., are especially useful for this purpose. The new copolymer polyamides which are usually most advantageous comprise about 20% to about 80% of one or more of the new dicarboxylic acid amides of the invention together with about 80% to about 20%, on a molar basis, of an amide of an aliphatic di-primary or -secondary amine and a dicarboxylic acid of the type previously indicated.

The new polyamides of the invention are conveniently produced by first preparing a dicarboxylic acid salt of the new diamine or diamines which have been chosen. The acid and amine reactants are used in approximately equimolar proportions. For best results not more than 5 mole percent excess of either reactant is employed. The new diamine-dicarboxylic acid salts are formed readily by bringing the reactants into intimate contact, with or without a suitable solvent, for instance that used in the preparation of the new diamine. It is usually desirable to separate and purify the salt by crystallization or otherwise but this is not essential. The conversion of the salt to the polyamide can be carried out by heating at amide-forming temperatures, generally between about 175° and 350° C. in the presence or absence of a solvent or diluent. The last stages of the reaction at least should be conducted under conditions which permit the escape of the water formed in the reaction. Most preferably a subatmospheric pressure is maintained during at least the last stages of reaction to promote removal of by-products. The new polyamide copolymers can be produced in the same way as the homopolymers by employing mixtures of the new dicarboxylic acid salts of the new diamines with salts of other diamines with the same or other dicarboxylic acids for the reaction.

The aliphatic dicarboxylic acids having a chain of 3 to 10 carbon atoms separating the carboxyl groups are particularly suitable for making these polyamides. In addition to the production of fibers, the polyamides of the invention can be converted to films, tubes, rods and other shapes. They can be used in coating and impregnating compositions. In all these uses they can be applied alone or as mixtures with other resins, plasticizers, pigments, dyes, etc. For application in moldings it is generally desirable to use polyamides which are lower melting than those which are preferred for fiber-forming use so it is usually advantageous to employ the new di-(amino-alkyl) xylylenes in which the amino groups are separated from the ring by 4 to 6 carbon atoms together with dicarboxylic acids having 12 to 22 carbon atoms in the chain linking the carboxyl groups.

As many widely different embodiments of the invention can be made without departing from the spirit and scope thereof, it is to be understood that the invention is not limited to the specific embodiments which have been given by way of illustration nor by any theory proposed in explanation of the improved results which are obtained.

We claim as our invention:

1. A hydrocarbyl-substituted di(cyanohydrocarbyl) benzene of the group consisting of di(cyanoalkyl) and di(cyanoalkenyl) benzenes wherein four of the carbon atoms of the benzene ring are directly attached to separate hydrocarbon radicals each having 1 to 6 carbon atoms and containing 2 to 6 carbon atoms in each of said cyanoalkyl and cyanoalkenyl radicals.

2. A hydrocarbyl-substituted di(cyanoalkyl) benzene wherein four of the carbon atoms of the benzene ring are directly attached to separate hydrocarbon radicals each having 1 to 6 carbon atoms and containing 2 to 6 carbon atoms in each of the cyanoalkyl radicals.

3. Bis(cyanoalkyl) tetramethyl benzene having 2 to 6 carbon atoms in each cyanoalkyl radical.

4. A 1,4-bis(cyanoalkyl)tetramethyl benzene having the cyano groups at the end of the chains of cyanoalkyl radicals each containing 2 to 6 carbon atoms.

5. Bis(cyanomethyl) tetramethyl benzene.

6. Bis(5-cyano-2-pentenyl) durene.

References Cited in the file of this patent

UNITED STATES PATENTS

| | | |
|---|---|---|
| 2,130,947 | Carothers | Sept. 20, 1938 |
| 2,158,064 | Carothers | May 16, 1939 |
| 2,185,237 | Weijlard et al. | Jan. 2, 1940 |
| 2,195,076 | Braun et al. | Mar. 26, 1940 |
| 2,244,192 | Flory | June 3, 1941 |
| 2,464,692 | Kirk et al. | Mar. 15, 1949 |
| 2,691,680 | Goodson et al. | Oct. 12, 1954 |
| 2,766,221 | Lum et al. | Oct. 9, 1956 |

OTHER REFERENCES

Karrer: Organic Chemistry, 2nd ed., pp. 177–178, Elsevier Publ. Co. Inc., N.Y., 1946.

Fusco et al.: Gazz. Chim. Ital., vol. 78, pp. 951–60 (1948).

Westfahl et al.: J.A.C.S., vol. 76, p. 1076 (1954).